(12) United States Patent
Li et al.

(10) Patent No.: US 8,677,817 B2
(45) Date of Patent: *Mar. 25, 2014

(54) AIR DAM DEPLOYMENT AND RETRACTION SYSTEM

(75) Inventors: Yunjun Li, West Bloomfield, MI (US); Theodore Adamczyk, Jr., Macomb, MI (US); Peter T. Karlson, Whitby (CA)

(73) Assignee: GM Global Technology Operations, Detroit, MI (US)

( * ) Notice: Subject to any disclaimer, the term of this patent is extended or adjusted under 35 U.S.C. 154(b) by 732 days.

This patent is subject to a terminal disclaimer.

(21) Appl. No.: 12/826,752

(22) Filed: Jun. 30, 2010

(65) Prior Publication Data

US 2012/0001450 A1   Jan. 5, 2012

(51) Int. Cl.
*G01P 5/00* (2006.01)
*B60J 9/00* (2006.01)

(52) U.S. Cl.
USPC .................. 73/170.11; 296/180.1; 296/180.4

(58) Field of Classification Search
None
See application file for complete search history.

(56) References Cited

U.S. PATENT DOCUMENTS

| 6,422,034 | B2 * | 7/2002 | Gehman et al. | 62/507 |
|---|---|---|---|---|
| 6,789,839 | B1 * | 9/2004 | Samuelson | 296/180.4 |
| 2007/0216194 | A1 * | 9/2007 | Rober et al. | 296/180.1 |
| 2007/0257512 | A1 * | 11/2007 | Anderson | 296/180.1 |
| 2010/0219661 | A1 * | 9/2010 | Butlin et al. | 296/180.1 |
| 2011/0187151 | A1 * | 8/2011 | Mackenzie et al. | 296/180.5 |
| 2011/0260499 | A1 * | 10/2011 | Li et al. | 296/180.1 |

FOREIGN PATENT DOCUMENTS

JP    59100007 A  *  6/1984

* cited by examiner

*Primary Examiner* — Andre Allen
(74) *Attorney, Agent, or Firm* — Quinn Law Group, PLLC (57) ABSTRACT

An air dam deployment and retraction system includes an air dam, a compressor, an air reservoir, a first switch, a second switch, and a third switch. The air dam is configured for moving between a deployed position and a retracted position. The compressor is configured to compress fluid. The air reservoir defines a chamber that is configured to receive a volume of the compressed fluid. The first switch is configured to selectively move between a first inactive position and a first active position. The first inactive position is configured to provide the compressed fluid to the atmosphere. The first active position is configured to provide the compressed fluid from the compressor to one of the chamber of the air reservoir and the air dam. The air dam is configured to move from the retracted position to the deployed position upon receiving the compressed fluid.

20 Claims, 5 Drawing Sheets

AIR DAM DEPLOYMENT AND RETRACTION SYSTEM

TECHNICAL FIELD

The present invention relates to an air dam deployment and retraction system.

BACKGROUND OF THE INVENTION

Vehicles are being designed to provide improved fuel economy. One of the ways to improve fuel economy is to improve the aerodynamic characteristics of the vehicle. Some vehicles are provided with an air dam that extends from beneath a front bumper of the vehicle, into close proximity with the ground. The air dams reduce drag on the vehicle at certain vehicle speeds, resulting in improved fuel economy.

SUMMARY OF THE INVENTION

An air dam deployment and retraction system includes a compressor, a first switch, and an air reservoir. The compressor is configured to compress fluid. The first switch is configured to receive a volume of compressed fluid from the compressor and is configured to selectively move between a first inactive position and a first active position. The air reservoir defines a chamber that is configured to receive the volume of the compressed fluid from the first switch. The first inactive position is configured to provide the volume of compressed fluid to atmosphere. The first active position is configured to provide the volume of compressed fluid to the chamber of the air reservoir and/or the air dam. The air dam is configured to deploy upon receiving the volume of compressed fluid.

A method of operating an air dam deployment and retraction system to move an air dam between a retracted position and a deployed position includes selectively moving a first switch between a first active position and a first inactive position. A volume of compressed fluid is provided to atmosphere when the first switch is in the first inactive position. The volume of compressed fluid is provided to at least one of an air reservoir and the air dam when the first switch is in the first active position. The air dam moves from the retracted position to the deployed position upon receiving the compressed fluid.

An air dam deployment and retraction system includes an air dam, a compressor, a first switch, and an air reservoir. The air dam is configured to move between a deployed position and a refracted position. The compressor is configured to compress fluid. The first switch is configured to receive a volume of compressed fluid from the compressor and is configured to selectively move between a first inactive position and a first active position. The air reservoir defines a chamber that is configured to receive the volume of the compressed fluid from the first switch. The first inactive position is configured to provide the volume of compressed fluid to atmosphere. The first active position is configured to provide the volume of compressed fluid to the chamber of the air reservoir and/or the air dam. The air dam is configured to deploy upon receiving the volume of compressed fluid The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
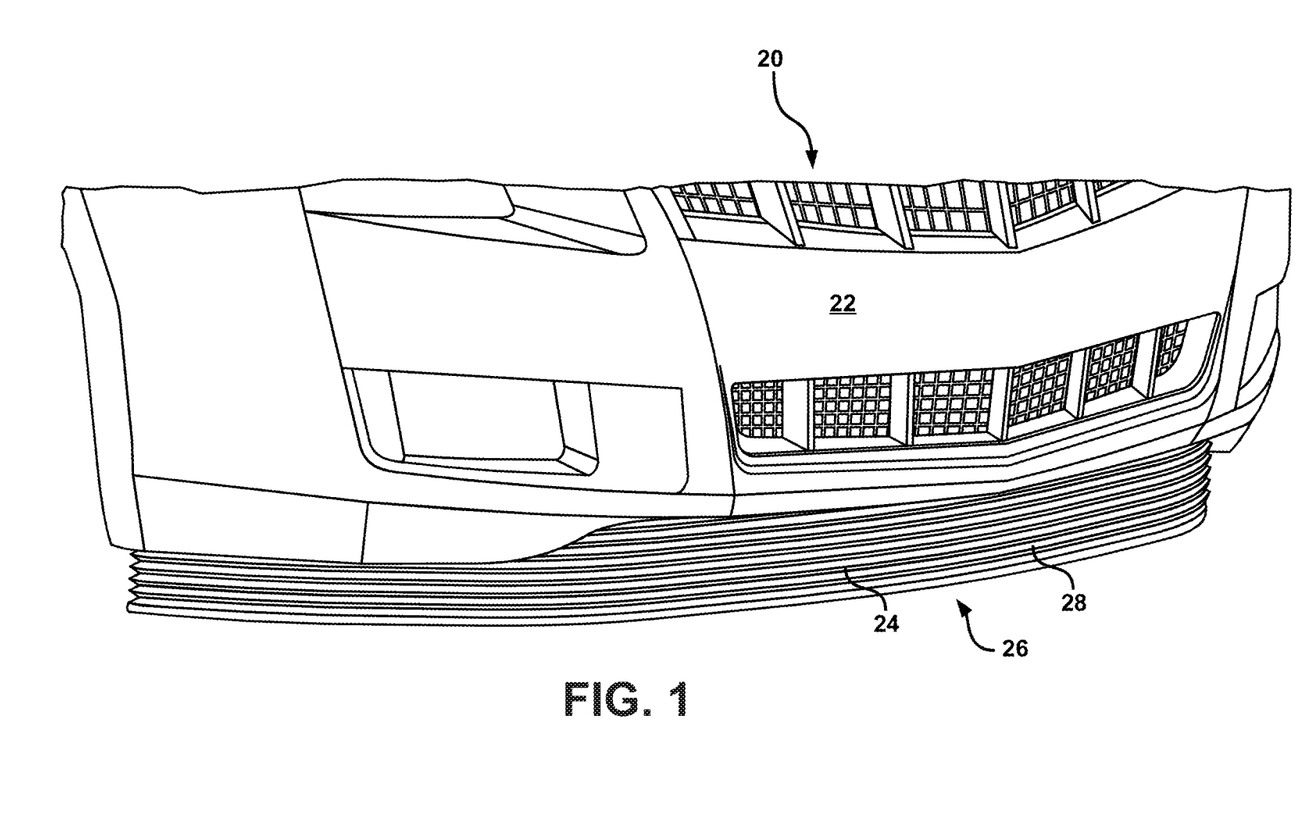
FIG. 1 is a schematic perspective illustration of a front fascia of a vehicle and an air dam.
Figure 2:
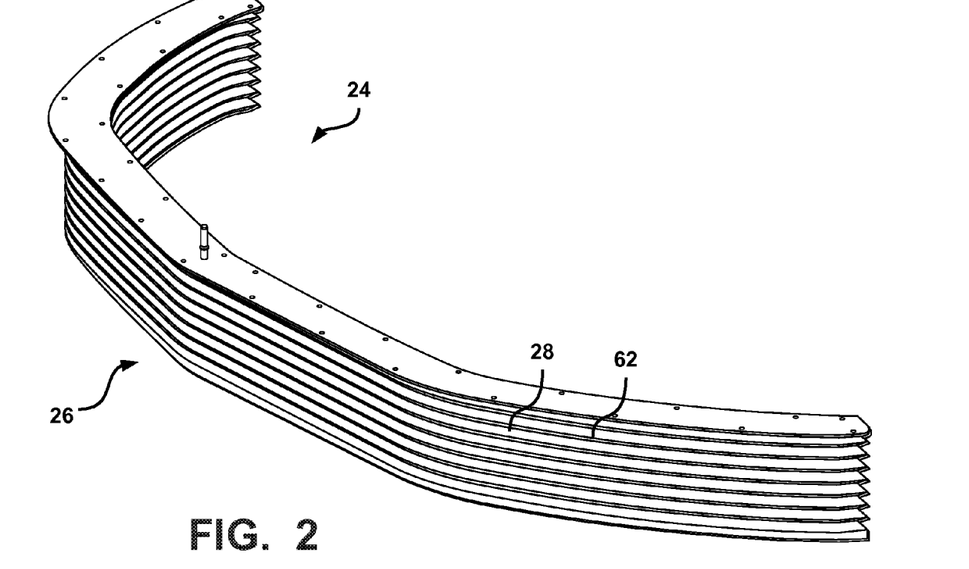
FIG. 2 is a schematic perspective illustration of the air dam.

Referring to the drawings, wherein like reference numbers correspond to like or similar components throughout the several figures, FIG. 1 shows a front portion of a vehicle 20 that has a fascia 22 that conceals a front bumper bar and other structure of the vehicle 20 body, not shown. FIG. 1 further shows an air dam 24 that is attached to an underside of the vehicle 20 at a deployed position 26, i.e., extended position, in which the air dam 24 will partially close out a space between the underside of the vehicle 20 and the road surface in order to improve the aerodynamic characteristics of the vehicle 20. FIG. 2 further shows the air dam 24 in the deployed position 26.

Figures 3, 4:
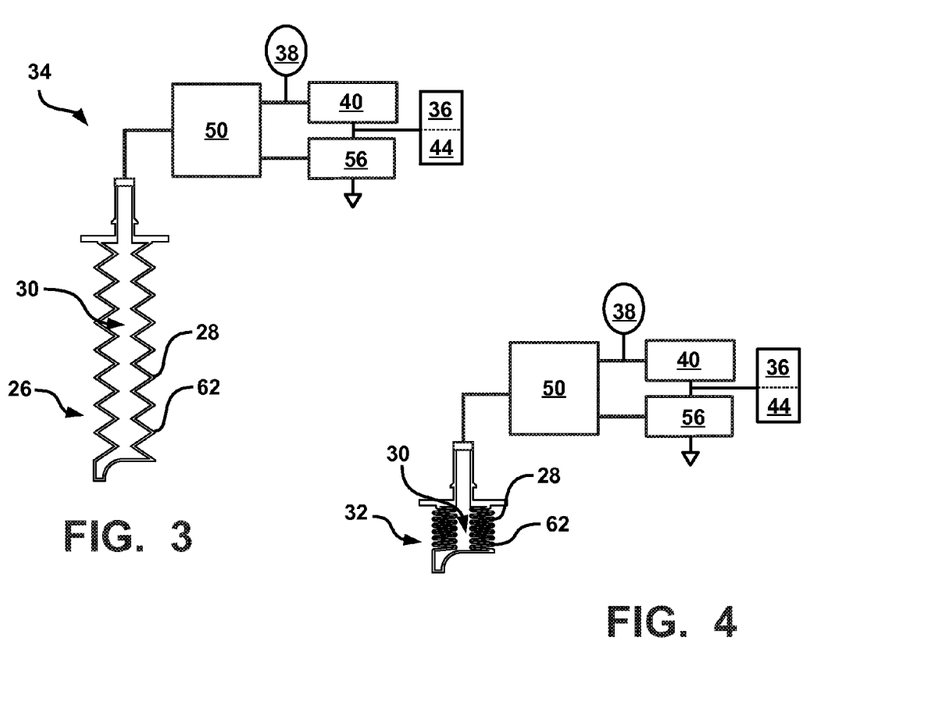
FIG. 3 is a schematic illustration of an air dam deployment and retraction system showing a cross-sectional side view of the air dam in a deployed position and a schematic representation of components for moving the air dam to this position.
FIG. 4 is a schematic illustration of an air dam deployment and retraction system showing a cross-sectional side view of the air dam in a retracted position and a schematic representation of components for moving the air dam to this position.

Referring now to FIGS. 3 and 4, the air dam 24 includes a plurality of walls 28 that cooperate to define a hollow interior of sealed air space 30. When a compressed fluid, such as air, enters the air space 30 of the air dam 24, the air dam 24 moves from a retracted position 32 to the deployed position 26, as shown in FIG. 3. Likewise, when the compressed fluid is expelled from the air space 30, the air dam 24 moves from the deployed position 26 to the retracted position 32, as shown in FIG. 4.

Figure 5:
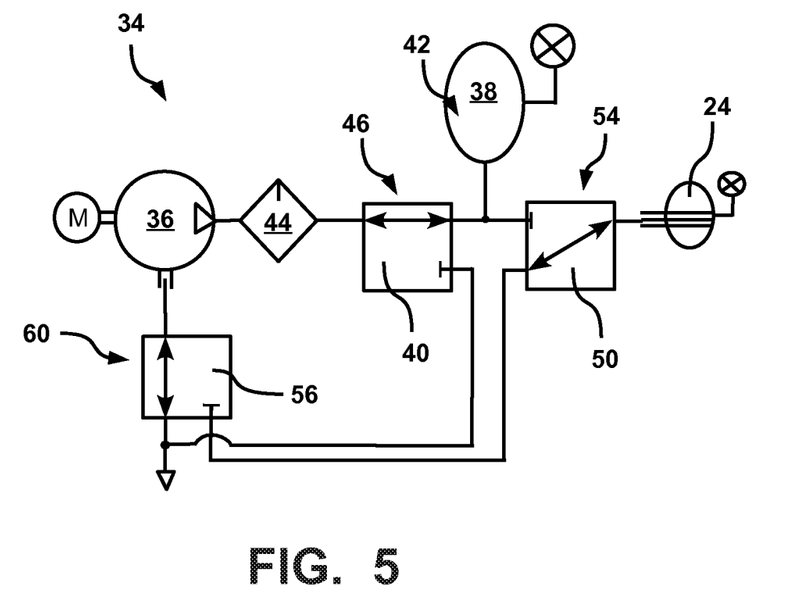
FIG. 5 is a schematic illustration of an air dam deployment and retraction system configured to fill the air reservoir with compressed fluid from atmosphere.
Figure 6:
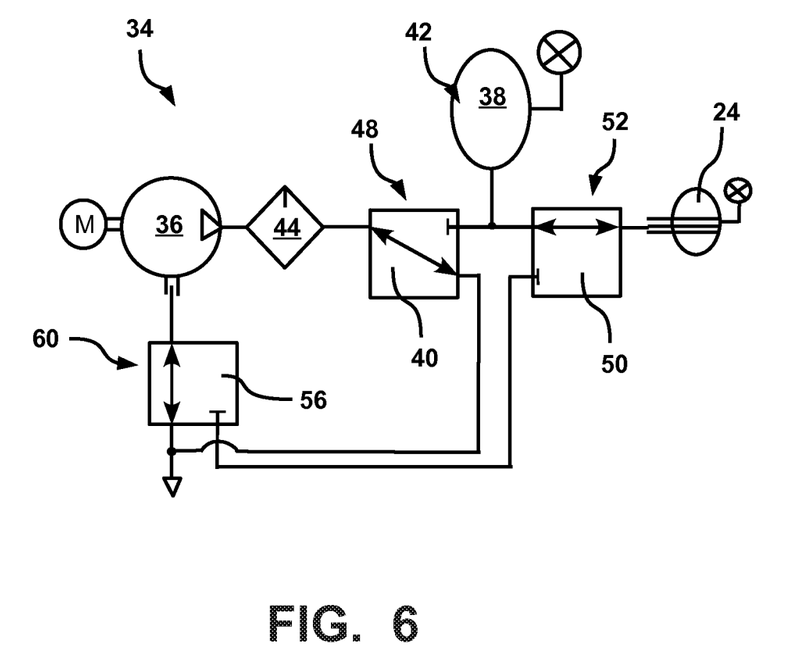
FIG. 6 is a schematic illustration of the air dam deployment and retraction system configured to fill the air dam with compressed fluid from the air reservoir, such that the air dam moves to the deployed position.
Figure 7:
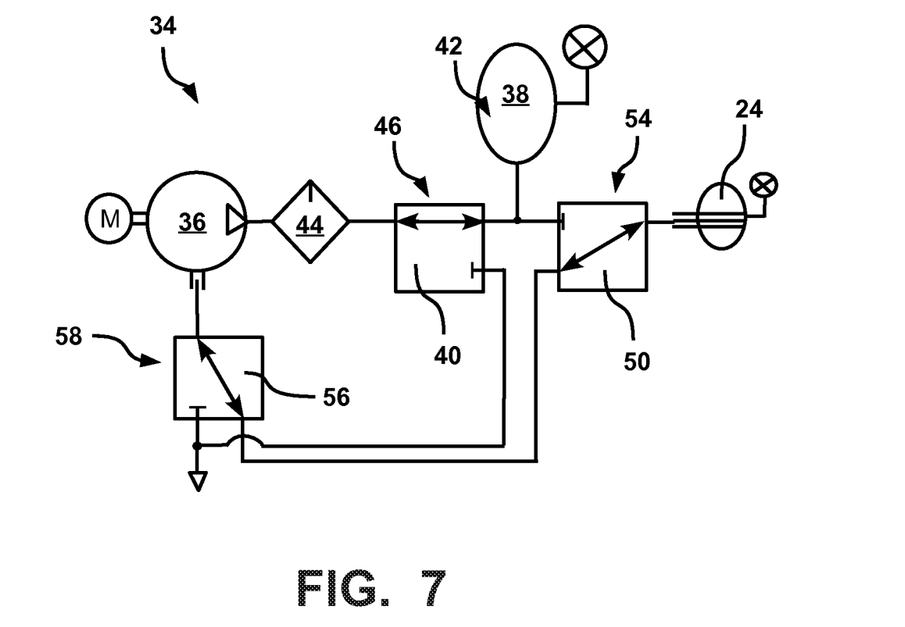
FIG. 7 is a schematic illustration of the air dam deployment and retraction system configured to evacuate the compressed fluid from the air dam to the air reservoir, such that the air dam moves to the retracted position.
Figure 8:
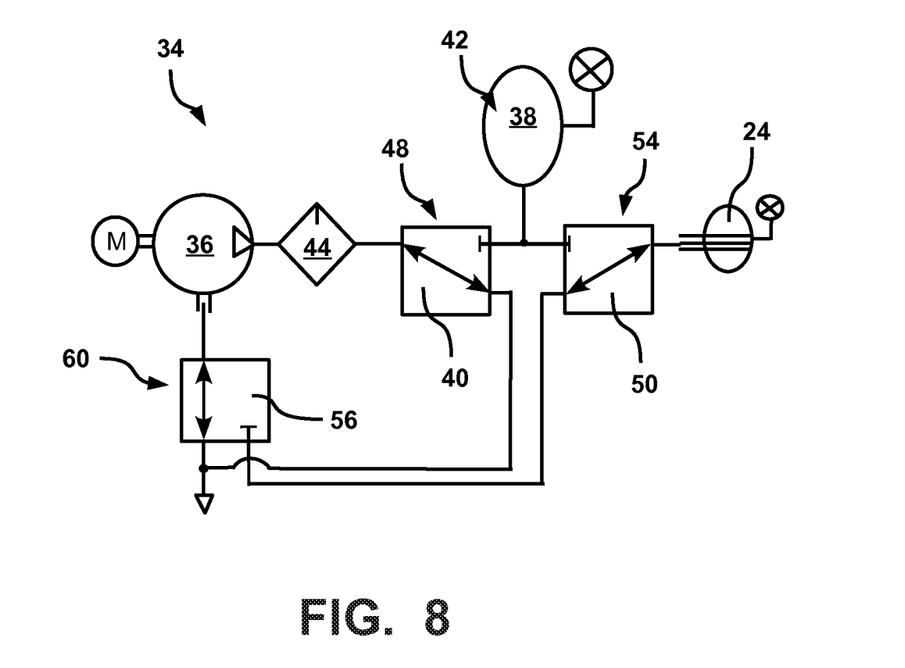
FIG. 8 is a schematic illustration of the air dam deployment and retraction system configured to hold the compressed fluid in the air dam, such that the air dam is maintained in the deployed position.
Figure 9:
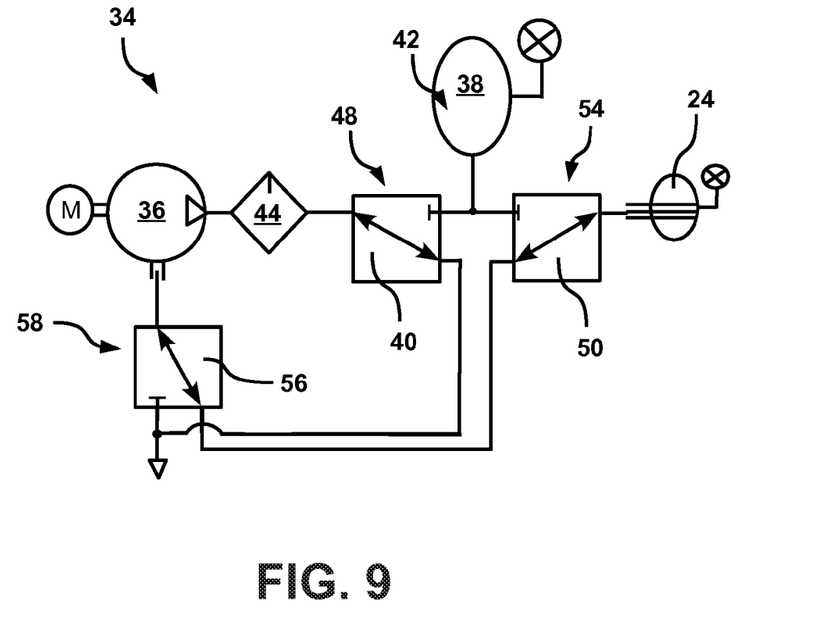
FIG. 9 is a schematic illustration of the air dam deployment and retraction system configured to evacuate the compressed fluid from the air dam to atmosphere, such that the air dam moves to the retracted position.
Figure 10:
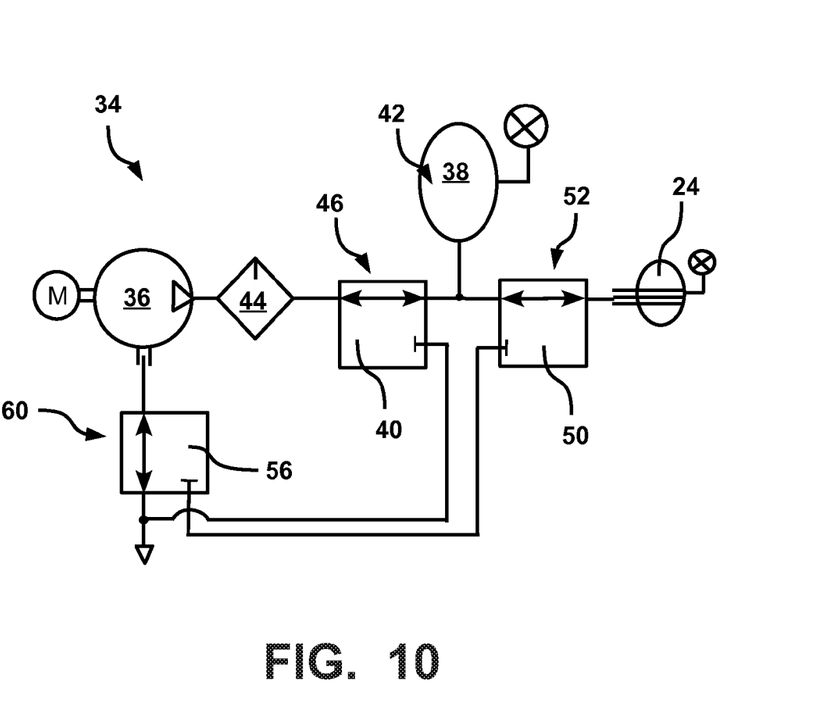
FIG. 10 is a schematic illustration of the air dam deployment and retraction system configured to fill the air dam and the air reservoir with compressed fluid from atmosphere, such that the air dam moves to the deployed position.

Referring to FIGS. 5-10, an air dam deployment and retraction system 34 is configured for deploying (i.e., extending) and retracting the air dam 24. The system 34 includes a compressor 36, an air reservoir 38, and a first switch 40. The compressor 36 is configured to compress fluid. The air reservoir 38 defines a chamber 42 that is configured to receive a volume of the compressed fluid. The system 34 may also include an air dryer 44 that is configured to receive and dry a volume of compressed fluid from the compressor 36 such that a source of dry compressed fluid is provided, or supplied, to the system 34. The first switch 40 is configured to selectively move between a first active position 46 and a first inactive position 48. Referring specifically to FIGS. 6, 8, and 9, the first inactive position 48 is configured to provide, or supply, the compressed fluid to the atmosphere. The first active position 46 is configured to provide the compressed fluid from the compressor 36 to the chamber 42 of the air reservoir 38, as illustrated in FIGS. 5, 7, and 10, and/or the air dam 24, as illustrated in FIG. 10. The air dam 24 is configured to move to the deployed position 26 as illustrated in FIG. 3, upon receiving the compressed fluid.

Referring again to FIGS. 5-10, the system 34 also includes a second switch 50 that is configured to selectively move between a second active position 52 and a second inactive position 54. The system 34 may also include a third switch 56 that is configured to selectively move between a third active position 58 and a third inactive position 60. Referring specifically to FIGS. 6 and 10, the second active position 52 is configured to provide compressed fluid received from the first switch 40 or the chamber 42 of the air reservoir 38 to the air dam 24 in order to move the air dam 24 to the deployed position 26. Referring specifically to FIGS. 5 and 7-9, the second inactive position 54 is configured to operatively disconnect the air dam 24 from the first valve and the air reservoir 38 such that the compressed fluid is prevented from moving from the first switch 40 and the air reservoir 38 to the air dam 24. Referring specifically to FIG. 9, the second inactive position 54 is also configured to operatively connect the air dam 24 with atmosphere such that the compressed fluid is expelled from the air dam 24 to atmosphere as the air dam 24 moves to the retracted position 32.

Referring to FIGS. 5, 6, 8, and 10, the third inactive position 60 is configured to operatively connect the compressor 36 with atmosphere such that the compressor 36 receives fluid from atmosphere. Referring specifically to FIGS. 5 and 8, the third inactive position 60 is also configured to operatively block compressed fluid from flowing from the air dam 24 to the air compressor 36 when the second valve is also in the second inactive position 54 such that the air dam 24 is prevented from moving to the retracted position 32. Referring to FIG. 8, the first inactive position 48 of the first switch 40, the second inactive position 54 of the second switch 50, and the third inactive position 60 of the third switch 56 also prevent the air dam 24 from moving to the extended position 26 from the retracted position 32. More specifically, FIG. 8 holds the air dam 24 in the extended position 26. Referring to FIGS. 7 and 9, the third active position 58 is configured to operatively connect the air dam 24 and the compressor 36 when the second valve is also in the second inactive position 54 such that the compressor 36 receives a volume of fluid from the air dam 24 as the air dam 24 moves to the retracted position 32.

Referring to FIGS. 5-10, a method of operating the air dam 24 deployment and retraction system 34 to move the air dam 24 between the retracted position 32 and the deployed position 26 includes providing a volume of compressed fluid. The volume of compressed fluid is provided by receiving a volume of fluid from the air dam 24 or atmosphere and compressing the volume of fluid with the compressor 36 to provide the volume of compressed fluid. The volume of compressed fluid may also be dried in the dryer in order to provide a volume of dried, compressed fluid to the system 34.

The first switch 40 is selectively moved between the first active position 46, as shown in FIGS. 5, 7, and 10, and the first inactive position 48, as shown in FIGS. 6, 8, and 9. The volume of compressed fluid is provided to atmosphere when the first switch 40 is in the first inactive position 48. The volume of compressed fluid is provided to the chamber 42 of the air reservoir 38 and/or the air dam 24 when the first switch 40 is in the first active position 46. The air dam 24 is configured to move from the retracted position 32 to the deployed position 26 upon receiving the volume of compressed fluid.

A second switch 50 is selectively moved between a second active position 52, as shown in FIGS. 6 and 10, and a second inactive position 54, as shown in FIGS. 5 and 7-9. The second active position 52 is configured to provide the compressed volume of fluid received from the first switch 40 and/or the chamber 42 of the air reservoir 38 to the air dam 24 such that the air dam 24 moves from the retracted position 32 to the deployed position 26. Conversely, the volume of compressed fluid is prevented from entering the air dam 24 from the first switch 40 and the air reservoir 38 when the second switch 50 is in the second inactive position 54.

Referring specifically to FIG. 9, the volume of fluid can be expelled from the air dam 24 to move the air dam 24 to the retracted position 32 when the second switch 50 is in the second inactive position 54. The second inactive position 54 of the second switch 50 is configured to operatively connect the air dam 24 with atmosphere and/or the air reservoir 38 such that the compressed fluid is expelled from the air dam 24 to atmosphere to move the air dam 24 from the deployed position 26 to the retracted position 32. More specifically, FIG. 9 illustrates that the second switch 50 and the first switch 40 are configured to operatively connect the air dam 24 with atmosphere when the second switch 50 is in the second inactive position 54 and the first switch 40 is in the first inactive position 48 such that the compressed volume of fluid is expelled from the air dam 24 to atmosphere such that the volume of fluid is expelled from the air dam 24 to atmosphere to move the air dam 24 from the deployed position 26 to the retracted position 32. Alternatively, FIG. 7 illustrates that the second switch 50 and the first switch 40 are configured to operatively connect the air dam 24 with the chamber 42 of the air reservoir 38 when the second switch 50 is in the second inactive position 54 and the first switch 40 is in the first active position 46 such that the volume of fluid is expelled from the air dam 24 to the chamber 42 of the air reservoir 38 to move the air dam 24 from the deployed position 26 to the retracted position 32. Referring to FIG. 7, the fluid from the air dam 24 is compressed into the air reservoir 38. In FIG. 7, the air dam 24 is "connected" with the air reservoir 38 such as the air dam 24 moves from the extended position 26 to the retracted position 32 as the compressed fluid is expelled from the air dam 24. The fluid within the air dam 22 is already pressurized. Therefore, the compressor 36 will compress pre-compressed fluid from the air dam 24 and into the reservoir 38 in order to increase the flow rate and save energy and/or electricity to run the compressor 36. The pressure in the air reservoir 38 should be higher than the air dam 24 by a predefined pressure when the air dam 24 is in the extended position 26 to ensure the fluid will flow into the air dam 24 from the air reservoir 38 at all of the relevant switch positions.

A third switch 56 is selectively moved between a third active position 58, as shown in FIGS. 7 and 9, and a third inactive position 60, as shown in FIGS. 5, 6, 8, and 10. The volume of fluid moves from atmosphere through the third switch 56 to the first switch 40 when the third switch 56 is in the third inactive position 60. The compressor 36 should not operate when the first switch 40 and the third switch 56 are in their respective inactive positions 48, 60.

Referring to FIGS. 5 and 8, the volume of fluid is prevented from moving from the air dam 24 through the third switch 56 when the second switch 50 is in the second inactive position 54 and the third switch 56 is in the third inactive position 60. As a result, the volume of fluid is retained in the air dam 24 and the air dam 24 remains in the deployed position 26 or remains in the retracted position 32. Referring now to FIG. 7, the volume of fluid is expelled from the air dam 24 to the air reservoir 38 through the second switch 50, the third switch 56, and the first switch 40, respectively, when the second switch 50 is in the second inactive position 54, the third switch 56 is in the third active position 58, and the first switch 40 is in the first active position 46. As a result, the air dam 24 moves from the deployed position 26 to the retracted position 32. Referring now to the configuration illustrated in FIG. 9, the volume of fluid is expelled from the air dam 24 to atmosphere through the second switch 50, the third switch 56, and the first switch 40, respectively, when the second switch 50 is in the second inactive position 54, the third switch 56 is in the third active position 58, and the first switch 40 is in the first inactive position 48 such that the air dam 24 moves from the deployed position 26 to the retracted position 32.

The air dam 24 is selectively moved between the retracted position 32 to the deployed position 26 and/or from the deployed position 26 to the retracted position 32 based on different criterion associated with one or more operating conditions. The operating conditions may include the vehicle 20 speed, compressor run time, compressor and valve's duty cycles control algorithm, temperature, relative humidity, wind speed, fill volume or pressure within the chamber 42 of the air reservoir 38, fill volume or pressure of the air dam 24, and the like. The system 34 may also include a controller, not shown, in operative communication with each of the switches 40, 50, 56, the compressor 36. Additionally, a displacement sensor, not shown, may be in operative communication with bellows 62 of the air dam 24 to measure movement of the air dam 24 to determine the position 26, 32 of the air dam 24. The pressure or displacement detected by sensors in the air dam 24 is but one factor that may be used to determine whether to signal one or more of the switches 40, 50, 56 to effectively change the position 26, 32 of the air dam 24. Likewise, a pressure sensor may be in operative communication with the air reservoir 38 to determine the pressure and volume of the fluid contained within the chamber 42 of the air reservoir 38. This pressure sensor also could detect and/or determine air dam fill rate/condition. The pressure detected by the sensor in the air reservoir 38 is another factor that may be used to determine whether to signal one or more of the switches 40, 50, 56 to effectively fill the chamber 42 of the air reservoir 38 with the volume of compressed fluid or to empty the volume of fluid from the air reservoir 38. The pressure sensor, if installed on the air dam 24, could indicate air pressure flow into the air dam 24, and inside of the air dam 24. Therefore, the controller is programmed to signal one or more of the switches 40, 50, 56 to move or remain in the respective active position 46, 52, 58 or inactive position 48, 54, 60 based on criterion that are associated with one or more of the operating conditions, as described in more detail below.

Referring specifically to the configuration illustrated in FIG. 5, the first switch 40 is in the first active position 46, the second switch 50 is in the second inactive position 54, and the third switch 56 is in the third inactive position 60, in response to a first criterion. This configuration may be used to fill of the system 34 at the assembly plant, after system service, or when a low system pressure is detected. In this configuration, a volume of fluid enters the system 34 from atmosphere through the third switch 56 and is compressed by the compressor 36 to provide a volume of compressed fluid. The volume of compressed fluid may be dried in the dryer before entering the first switch 40. The volume of dried, compressed fluid moves through the first switch 40 and enters the chamber 42 of the air reservoir 38 where the fluid is stored for later use, as needed. In this configuration, the volume of dried, compressed fluid is prevented or blocked from entering the air dam 24 through the second switch 50 because the second switch 50 is in the second inactive position 54. Likewise, any fluid contained within the air dam 24 is also prevented or blocked from exiting the air dam 24 through the second switch 50 because the third switch 56 is in the third inactive position 60. Therefore, the air dam 24 is held or maintained in either the deployed position 26 or the retracted position 32.

Another configuration is illustrated in FIG. 6. In this configuration, the first switch 40 is in the first inactive position 48, the second switch 50 is in the second active position 52, and the third switch 56 is in the third inactive position 60, in response to a second criterion. In this configuration, the compressor 36 is not in operation. The fluid flows from the air reservoir 38 to the air dam 24 by virtue of a pressure difference between the air reservoir 38 and the air dam 24, i.e., the higher pressure difference will move the air dam 24 more quickly. In this configuration, the volume of dried, compressed fluid contained within the chamber 42 of the air reservoir 38 may flow through the second switch 50 to fill the air dam 24 and move the air dam 24 from the retracted position 32 to the deployed position 26.

In yet another configuration, illustrated in FIG. 7, the first switch 40 is in the first active position 46, the second switch 50 is in the second inactive position 54, and the third switch 56 is in the third active position 58, in response to a third criterion. In this configuration, a volume of fluid exits, or is exhausted from, the air dam 24 and flows through the second switch 50 and the third switch 56 where the volume of fluid is compressed by the compressor 36 to provide a volume of compressed fluid. The volume of compressed fluid may be dried in the dryer before entering the first switch 40. However, it should be appreciated that normally, the fluid cycles between the air reservoir 38 and the air dam 24 will not contain much moisture. The volume of dried, compressed fluid moves through the first switch 40 and enters the chamber 42 of the air reservoir 38 where the fluid is stored for later use, as needed. Therefore, the air dam 24 moves from the deployed position 26 to the retracted position 32. The volume of dried, compressed fluid is prevented, or blocked, from entering the air dam 24 in this configuration through the second switch 50 because the second switch 50 is in the second inactive position 54.

In the configuration illustrated in FIG. 8, the first switch 40 is in the first inactive position 48, the second switch 50 is in the second inactive position 54, and the third switch 56 is in the third inactive position 60, in response to a fourth criterion. In this configuration, the system 34 is in a low energy state because the air compressor 36 is not in operation and all the switches 40, 50, 56 are in their respective inactive positions 48, 54, 60. The volume of dried, compressed fluid is prevented or blocked from entering the air dam 24 from the chamber 42 of the air reservoir 38 through the second switch 50 because the second switch 50 is in the second inactive position 54. Likewise, any fluid contained within the air dam 24 is also prevented or blocked from exiting the air dam 24 through the second switch 50 because the third switch 56 is in the third inactive position 60. Therefore, when the system 34 is in the low energy state, the air dam 24 is held in either the deployed position 26 or the retracted position 32 and the volume of fluid within the chamber 42 of the air reservoir 38 is also constant.

Referring to the configuration illustrated in FIG. 9, the first switch 40 is in the first inactive position 48, the second switch 50 is in the second inactive position 54, and the third switch 56 is in the third active position 58, in response to a fifth criterion. More specifically, this configuration is used during service to the system 34. In this configuration, a volume of fluid exits, or is exhausted from, the air dam 24 and flows through the second switch 50 and the third switch 56 and is compressed by the compressor 36 to provide a volume of compressed fluid. The volume of compressed fluid may be dried in the dryer before entering the first switch 40. The volume of dried, compressed fluid moves through the first switch 40 and is exhausted from the system 34 to atmosphere. Therefore, the air dam 24 is moved from the deployed position 26 to the retracted position 32 and the volume of fluid within the chamber 42 of the air reservoir 38 is maintained.

In the configuration illustrated in FIG. 10, the first switch 40 is in the first active position 46, the second switch 50 is in the second active position 52, and the third switch 56 is in the third inactive position 60, in response to a sixth criterion. More specifically, this configuration should only be used when performing service on the system 34 and/or when performing an initial functional check on the system 34. In this configuration, a volume of fluid enters the system 34 from atmosphere through the third switch 56 and is compressed by the compressor 36 to provide a volume of compressed fluid. The volume of compressed fluid may be dried in the dryer before entering the first switch 40. The volume of dried, compressed fluid moves through the first switch 40 and enters the chamber 42 of the air reservoir 38 and the air dam 24. The volume of dried, compressed fluid is stored in the chamber 42 of the air reservoir 38 for later use, as needed. The volume of dried, compressed fluid that enters the air dam 24 moves the air dam 24 from the retracted position 32 to the deployed position 26.

Additionally, with respect to the embodiments described above, it should be appreciated that the compressor 36 may be configured to be only sealed on an output side, i.e., higher pressure side. Depending on the pressure inside of the air dam 24 and the internal design of the compressor 36, the compressor 36 may also be configured to be sealed on an input port side, i.e., low pressure side, if the pressure of the air dam 24 is higher than a predetermined pressure limit. Also, with respect to the dryer 44, they system 34 is configured to be a "partially closed system" such that compressed fluid is recycled between the air reservoir 38 and the air dam 24. Therefore, the air dryer 44 may not be required to be serviceable, or to be regenerative.

While the best modes for carrying out the invention have been described in detail, those familiar with the art to which this invention relates will recognize various alternative designs and embodiments for practicing the invention within the scope of the appended claims.

The invention claimed is:

1. An air dam deployment and refraction system configured for deploying and retracting an air dam, the system comprising:
   a compressor configured to compress fluid;
   a first switch configured to receive a volume of compressed fluid from the compressor and configured to selectively move between a first inactive position and a first active position; and
   an air reservoir defining a chamber that is configured to receive the volume of the compressed fluid from the first switch;
   wherein the first inactive position is configured to provide the volume of compressed fluid to atmosphere;
   wherein the first active position is configured to provide the volume of compressed fluid to at least one of the chamber of the air reservoir and the air dam;
   wherein the air dam is configured to deploy upon receiving the volume of compressed fluid.

2. A system, as set forth in claim 1, further comprising:
   a second switch configured to receive the compressed fluid from at least one of the first switch and the air reservoir and configured to selectively move between a second active position and a second inactive position;
   wherein the second active position is configured to provide the compressed fluid to the air dam such that the air dam is deployed;
   wherein the second inactive position is configured to operatively disconnect the air dam from each of the first switch and the air reservoir such that the compressed fluid is prevented from moving from each of the first switch and the air reservoir to the air dam.

3. A system, as set forth in claim 2, wherein the second inactive position is configured to operatively connect the air dam with atmosphere such that the compressed fluid is expelled from the air dam to atmosphere as the air dam retracts; and
   wherein the second inactive position is configured to operatively block compressed fluid from flowing from at least one of the air compressor and the air reservoir such that the air dam is prevented from deploying.

4. A system, as set forth in claim 2, further comprising:
   a third switch configured to receive fluid from one of the air dam and atmosphere and configured to selectively move between a third active position and a third inactive position;
   wherein the third inactive position is configured to operatively connect the compressor with atmosphere such that the compressor receives fluid from atmosphere;
   wherein the third inactive position is configured to operatively block compressed fluid from flowing from the air dam to the air compressor such that the air dam is prevented from retracting; and
   wherein the third active position is configured to operatively connect the air dam and the compressor when the second switch is in the second inactive position such that the compressor receives a volume of fluid from the air dam as the air dam retracts.

5. A system, as set forth in claim 1, further comprising an air dryer configured to receive and dry a volume of compressed fluid from the compressor such that a volume of dry compressed fluid is provided to the system.

6. A method of operating an air dam deployment and retraction system to move an air dam between a retracted position and a deployed position, the method comprising:
   selectively moving a first switch between a first active position and a first inactive position;
   providing a volume of compressed fluid to atmosphere when the first switch is in the first inactive position;
   wherein the volume of compressed fluid is provided to at least one of an air reservoir and the air dam when the first switch is in the first active position;
   wherein the air dam moves from the retracted position to the deployed position upon receiving the compressed fluid.

7. A method, as set forth in claim 6, further comprising:
   selectively moving a second switch between a second active position and a second inactive position;
   wherein the second active position is configured to provide the compressed volume of fluid received from at least one of the first switch and the chamber of the air reservoir to the air dam such that the air dam moves from the retracted position to the deployed position;

wherein the volume of compressed fluid is prevented from entering the air dam from each of the first switch and the air reservoir when the second switch is in the second inactive position;

wherein the volume of compressed fluid is expelled from the air dam to move the air dam to the retracted position when the second switch is in the second inactive position.

8. A method, as set forth in claim 7, wherein the second inactive position of the second switch is configured to operatively connect the air dam with atmosphere such that the compressed fluid is expelled from the air dam to atmosphere to move the air dam from the deployed position to the retracted position.

9. A method, as set forth in claim 7, wherein the second switch and the first switch are each configured to operatively connect the air dam with the chamber of the air reservoir when the second switch is in the second inactive position and the first switch is in the first active position such that the compressed volume of fluid is expelled from the air dam to the chamber of the air reservoir to move the air dam from the deployed position to the retracted position.

10. A method, as set forth in claim 9, wherein the second switch and the first switch are each configured to operatively connect the air dam with atmosphere when the second switch is in the second inactive position and the first switch is in the first inactive position such that the compressed volume of fluid is expelled from the air dam to atmosphere to move the air dam from the deployed position to the retracted position.

11. A method, as set forth in claim 6, wherein providing a volume of compressed fluid is further defined as:
receiving a volume of fluid from one of the air dam and atmosphere; and
compressing the volume fluid to provide a volume of compressed fluid.

12. A method, as set forth in claim 6, further comprising:
selectively moving a third switch between a third active position and a third inactive position;
wherein the volume of fluid moves from atmosphere through the third switch to the first switch when the third switch is in the third inactive position;
wherein the volume of fluid is compressed between the third switch and the first switch;
wherein the volume of compressed fluid is prevented from moving from the air dam through the third switch when the second switch is in the second inactive position and the third switch is in the third inactive position such that the volume of compressed fluid is retained in the air dam and the air dam remains in one of the deployed position and the retracted position;
wherein the volume of fluid is expelled from the air dam to the air reservoir through the second switch, the third switch, and the first switch, respectively, when the second switch is in the second inactive position, the third switch is in the third active position, and the first switch is in the first active position such that the air dam moves from the deployed position to the retracted position; and
wherein the volume of fluid is expelled from the air dam to atmosphere through the second switch, the third switch, and the first switch, respectively, when the second switch is in the second inactive position, the third switch is in the third active position, and the first switch is in the first inactive positions such that the air dam moves from the deployed position to the retracted position.

13. A method, as set forth in claim 12, further comprising drying the volume of compressed fluid to provide a volume of dried, compressed fluid to the system.

14. A method, as set forth in claim 12, wherein the first switch is in the first active position, the second switch is in the second inactive position, and the third switch is in the third inactive position, in response to a first criterion such that the air dam is held in one of the deployed position and the retracted position.

15. A method, as set forth in claim 12, wherein the first switch is in the first inactive position, the second switch is in the second active position, and the third switch is in the third inactive position, in response to a second criterion such that the volume of dried, compressed fluid contained within the chamber of the air reservoir flows through the second switch to fill the air dam and move the air dam from the retracted position to the deployed position.

16. A method, as set forth in claim 12, wherein the first switch is in the first active position, the second switch is in the second inactive position, and the third switch is in the third active position, in response to a third criterion such that the air dam moves from the deployed position to the retracted position.

17. A method, as set forth in claim 12, wherein the first switch is in the first inactive position, the second switch is in the second inactive position, and the third switch is in the third inactive position, in response to a fourth criterion such that the air dam is held in one of the deployed position and the retracted position and the volume of fluid within the chamber of the air reservoir is held constant.

18. A method, as set forth in claim 12, wherein the first switch is in the first inactive position, the second switch is in the second inactive position, and the third switch is in the third active position, in response to a fifth criterion such that the air dam is moved from the deployed position to the retracted position and the volume of fluid within the chamber of the air reservoir is held constant.

19. A method, as set forth in claim 12, wherein the first switch is in the first active position, the second switch is in the second active position, and the third switch is in the third inactive position, in response to a sixth criterion such that the air dam moves from the retracted position to the deployed position and the air reservoir is filled with compressed fluid.

20. An air dam deployment and retraction system comprising:
an air dam configured for moving between a deployed position and a retracted position;
a compressor configured to compress fluid;
a first switch configured to receive a volume of compressed fluid from the compressor and configured to selectively move between a first inactive position and a first active position; and
an air reservoir defining a chamber that is configured to receive the volume of the compressed fluid from the first switch;
wherein the first inactive position is configured to provide the volume of compressed fluid to atmosphere;
wherein the first active position is configured to provide the volume of compressed fluid to at least one of the chamber of the air reservoir and the air dam;
wherein the air dam is configured to deploy upon receiving the volume of compressed fluid.

* * * * *